US012738407B2

(12) United States Patent
Hu et al.

(10) Patent No.: US 12,738,407 B2
(45) Date of Patent: Sep. 15, 2026

(54) POWER INDUCTOR, PREPARATION METHOD OF POWER INDUCTOR, AND SYSTEM IN PACKAGE MODULE

(71) Applicant: Huawei Digital Power Technologies Co., Ltd., Shenzhen (CN)

(72) Inventors: Xiaoqing Hu, Dongguan (CN); Yanjun Zhi, Dongguan (CN); Xiaming Jing, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 835 days.

(21) Appl. No.: 18/166,010

(22) Filed: Feb. 8, 2023

(65) Prior Publication Data

US 2023/0187114 A1 Jun. 15, 2023

Related U.S. Application Data

(63) Continuation of application No. PCT/CN2021/111322, filed on Aug. 6, 2021.

(30) Foreign Application Priority Data

Aug. 9, 2020 (CN) ........................ 202010792435.X

(51) Int. Cl.
*H01F 27/08* (2006.01)
*H01F 27/06* (2006.01)
(Continued)

(52) U.S. Cl.
CPC ........... *H01F 27/255* (2013.01); *H01F 27/06* (2013.01); *H01F 27/2847* (2013.01);
(Continued)

(58) Field of Classification Search
CPC .... H01F 27/255; H01F 27/06; H01F 27/2847; H01F 27/306; H01F 27/324;
(Continued)

(56) References Cited

U.S. PATENT DOCUMENTS

| | | | |
|---|---|---|---|
| 6,791,445 | B2 | 9/2004 | Shibata et al. |
| 9,263,177 | B1 | 2/2016 | Ikriannikov et al. |

(Continued)

FOREIGN PATENT DOCUMENTS

| | | | |
|---|---|---|---|
| CN | 1862720 | A | 11/2006 |
| CN | 102007553 | B | 12/2012 |

(Continued)

*Primary Examiner* — Shawki S Ismail
*Assistant Examiner* — Kazi S Hossain
(74) *Attorney, Agent, or Firm* — Conley Rose, P.C.

(57) ABSTRACT

A power inductor includes a winding and a metal magnetic powder core. The metal magnetic powder core is configured to support the winding, and the winding uses a metal conductive sheet. During assembly, the metal magnetic powder core is integrated with the winding through pressing, the metal magnetic powder core wraps the winding, and the metal magnetic powder core is insulated from the winding. The winding has a first pin and a second pin, and the first pin and the second pin are exposed on different surfaces of the metal magnetic powder core. Pins are separately disposed on two different surfaces of the power inductor. In addition, the winding is formed by integrally pressing the metal conductive sheet and the metal magnetic powder core.

20 Claims, 9 Drawing Sheets

(51) Int. Cl.

| | |
|---|---|
| ***H01F 27/255*** | (2006.01) |
| ***H01F 27/28*** | (2006.01) |
| ***H01F 27/30*** | (2006.01) |
| ***H01F 27/32*** | (2006.01) |
| ***H01F 41/02*** | (2006.01) |

(52) U.S. Cl.
CPC ......... *H01F 27/306* (2013.01); *H01F 27/324* (2013.01); *H01F 41/0246* (2013.01); *H01F 2027/065* (2013.01)

(58) Field of Classification Search
CPC ........... H01F 41/0246; H01F 2027/065; H01F 2017/048; H01F 1/24; H01F 27/2852; H01F 17/04; H01F 27/292; H10W 90/00
USPC ................................. 336/192, 200, 232, 198
See application file for complete search history.

(56) References Cited

U.S. PATENT DOCUMENTS

| | | | | |
|---|---|---|---|---|
| 10,325,715 | B2 | 6/2019 | Knoll et al. | |
| 2001/0016977 | A1 | 8/2001 | Moro et al. | |
| 2002/0009577 | A1* | 1/2002 | Takaya ................. | H03H 7/0115 428/209 |
| 2003/0141952 | A1 | 7/2003 | Moro et al. | |
| 2004/0017276 | A1* | 1/2004 | Chen ..................... | H01F 27/027 336/192 |
| 2014/0176286 | A1* | 6/2014 | Okada ................. | H01F 17/0013 336/200 |
| 2014/0320249 | A1 | 10/2014 | Nobusaka et al. | |
| 2018/0068775 | A1 | 3/2018 | Kwon et al. | |
| 2018/0144859 | A1 | 5/2018 | Araki | |
| 2019/0392987 | A1 | 12/2019 | Sheng | |
| 2020/0035413 | A1 | 1/2020 | Hanson et al. | |
| 2021/0193360 | A1* | 6/2021 | Hanson ............... | H01F 41/0246 |
| 2021/0272740 | A1* | 9/2021 | Wakabayashi .......... | H01F 27/29 |
| 2022/0208438 | A1* | 6/2022 | Hwang ............... | H01F 17/0013 |

FOREIGN PATENT DOCUMENTS

| | | | |
|---|---|---|---|
| CN | 106548851 | A | 3/2017 |
| CN | 106158293 | B | 3/2018 |
| CN | 107768069 | A | 3/2018 |
| CN | 210325447 | U | 4/2020 |
| CN | 111243814 | A | 6/2020 |
| CN | 112509783 | A | 3/2021 |
| EP | 1080477 | B1 | 10/2008 |
| JP | 2002184634 | A | 6/2002 |
| KR | 20180017409 | A | 2/2018 |
| WO | 2010123019 | A1 | 10/2010 |
| WO | 2011149944 | A3 | 10/2012 |

* cited by examiner

POWER INDUCTOR, PREPARATION METHOD OF POWER INDUCTOR, AND SYSTEM IN PACKAGE MODULE

CROSS-REFERENCE TO RELATED APPLICATIONS

This application is a continuation application of International Patent Application No. PCT/CN2021/111322 filed on Aug. 6, 2021, which claims priority to Chinese Patent Application No. 202010792435.X filed on Aug. 9, 2020. The disclosures of the aforementioned applications are hereby incorporated by reference in their entireties.

TECHNICAL FIELD

This application relates to the field of electronic technologies, and in particular, to a power inductor, a preparation method of a power inductor, and a system in package module.

BACKGROUND

Rapid development of electronic products requires that an integrated circuit (IC) component evolves toward a stronger function and a higher degree of integration. However, as the Moore's law of an IC industry gradually approaches a physical limit, further integration of a chip process is greatly challenged, and therefore, a system in package (SiP) module obtained after a plurality of components are integrally packaged is developed. However, an existing SiP module generally integrally plastic-packages components that are tiled and interconnected, and consequently, a space size in a plane direction of the SiP module is difficult to reduce. In addition, export of heat dissipation on the back of the component through a plastic sealant is greatly limited, and for a line connection, heat is only exported by using the bottom of a single surface. This restricts efficient integration and heat dissipation of a product. Therefore, a power system in a package of a power SiP (PSiP) module implements high power and miniaturization by increasing a degree of integration of the components in a vertical direction. However, a manner of disposing pins on a same plane of components in a conventional technology cannot match an existing PSiP module of a high degree of integration of the components in the vertical direction.

SUMMARY

This application provides a power inductor, a preparation method of a power inductor, and a SiP module, to improve adaptability of the inductor and reduce loss of the inductor.

This application provides a power inductor, and the power inductor is applied to a system in package module. The power inductor includes a winding and a metal magnetic powder core. The metal magnetic powder core is configured to support the winding, and the winding uses a metal conductive sheet. During assembly, the metal magnetic powder core is integrated with the winding through pressing, the metal magnetic powder core wraps the winding, and the metal magnetic powder core is insulated from the winding. The winding has a first pin and a second pin, and the first pin and the second pin are exposed on different surfaces of the metal magnetic powder core. Pins are separately disposed on two different surfaces of the power inductor, such that the power inductor can match a SiP module in which components are arranged in different directions. Therefore, disposing of the inductor is facilitated. In addition, the winding is formed by integrally pressing the metal conductive sheet and the metal magnetic powder core, such that inductance of the power inductor is increased, loss of the inductor is reduced, and miniaturization of the inductor is improved.

In an implementable solution, the metal magnetic powder core has a first external surface and a second external surface that are away from each other, the first pin is exposed on the first external surface, and the second pin is exposed on the second external surface. Therefore, adaptability of the power inductor is improved.

In an implementable solution, the winding includes a body structure and a first connection structure and a second connection structure that are connected to two ends of the body structure in a one-to-one correspondence. The first connection structure includes the first pin, and the second connection structure includes the second pin. The two disposed connection structures are connected to the body structure, and are used as pins of the power inductor.

In an implementable solution, the first connection structure, the second connection structure, and the body structure are an integrated structure. Therefore, resistance of the winding is reduced.

In an implementable solution, the second connection structure further includes a third pin, and the third pin and the first pin are located on a same surface. A plurality of pins is formed, such that the inductor has different current paths.

In an implementation solution, a first current path length is less than a second current path length, the first current path length is a current path length from the first pin to the second pin, and the second current path length is a current path length from the third pin to the second pin. This adapts to different connection scenarios.

In an implementable solution, the body structure is Z-shaped, the first connection structure is connected to one end of the Z-shaped body structure, and the second connection structure is connected to the other end of the Z-shaped body structure. Therefore, a space volume occupied by the inductor is reduced.

In an implementable solution, the body structure may alternatively be different shapes such as an L-shape, an S-shape, or an M-shape. Therefore, different inductance values can be provided.

In an implementation solution, the winding is a bare copper sheet formed through stamping. Therefore, resistance of the power inductor and loss of the power inductor are reduced.

In an implementable solution, there is a plurality of windings, and the plurality of windings is arranged in a single row. Therefore, modularization is facilitated.

According to a second aspect, a preparation method of a power inductor is provided, and the preparation method includes the following steps: pressing a metal magnetic powder core in segments; and filling a winding into the metal magnetic powder core in a process of pressing the metal magnetic powder core in segments, where the winding is a metal conductive sheet, the winding has a first pin and a second pin, and the first pin and the second pin are exposed on different surfaces of the metal magnetic powder core.

In the foregoing technical solution, a partial magnetic core is pressed in segments to increase pressure in a process of forming the inductor, such that magnetic permeability of a material of the metal magnetic powder core can be improved, and inductance can be increased, and therefore, miniaturization of the inductor is facilitated. In addition, pins are separately disposed on two different surfaces of the power inductor, such that the power inductor can match a SiP module in which components are arranged in different directions.

In an implementable solution, the method further includes: performing high-temperature annealing after the metal magnetic powder core is pressed in segments. High-temperature annealing is performed after pressing, such that loss of a magnetic material is significantly reduced, and overall loss of the inductor is finally reduced, to ensure that the inductor has relatively low operating temperature.

In an implementable solution, annealing temperature of the high-temperature annealing is not less than 400° C. Therefore, loss of a magnetic material is reduced, and overall loss of the inductor is finally reduced, to ensure that the inductor has relatively low operating temperature.

In an implementation, the annealing temperature may be different temperature such as 500 degrees Celsius (° C.), 600° C., or 700° C. When the high-temperature annealing is used, loss of a magnetic material is reduced, and overall loss of the inductor is finally reduced.

In an implementable solution, pressing the metal magnetic powder core in segments includes pressing the metal magnetic powder core in two segments; or pressing the metal magnetic powder core in three segments. Pressing may be performed in segments in different manners based on a shape of the winding.

According to a third aspect, a SiP module is provided. The SiP module includes a circuit board and the power inductor according to any one of the foregoing implementable solutions that is disposed on the circuit board. Pins are separately disposed on two opposite surfaces of the power inductor, such that the power inductor can match a SiP module in which components are arranged in a vertical direction. Therefore, disposing of the inductor is facilitated.

DESCRIPTION OF EMBODIMENTS

The following further describes in embodiments of this application with reference to the accompanying drawings.

Figure 1:
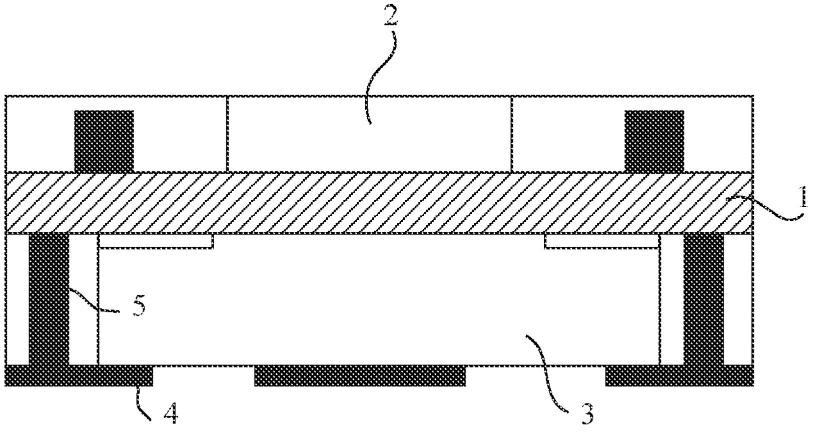
FIG. 1 is a schematic diagram of an application scenario of a power inductor in a conventional technology.

First, an application scenario of an inductor provided in embodiments of this application is described. The inductor may be applied to various electronic components. For example, the inductor may be used as a core component of a power direct current to direct current (DC/DC) converter. The inductor is widely used in fields such as an industrial device, consumer electronics, and chip power supply, and is particularly applied to a package module of a buck converter powered by high-power consumer electronics and a high-current chip. However, for a high-frequency high-current DC/DC power conversion SiP module, because a high degree of integration is required, the inductor needs to be characterized by a small volume, low loss, and high direct-current bias, and needs to meet a requirement for integration of components in a vertical direction. FIG. 1 shows a structure of a SiP module. The SiP module includes a substrate 1, a chip 2 disposed on one surface of the substrate 1, and an inductor 3 disposed on the other opposite surface of the substrate 1. Both the chip 2 and the inductor 3 are electrically connected to a circuit layer of the substrate 1, and both the chip 2 and the inductor 3 are packaged by using a packaging layer. Still referring to FIG. 1, a pin 4 is disposed on one surface of the inductor 3, and the pin 4 is disposed on a surface that is of the inductor 3 and that is away from the substrate 1, when the inductor 3 is electrically connected to the substrate 1, the pin 4 needs to be connected to the substrate 1 by disposing a metal through-hole 5 on the packaging layer. A manner of electrically connecting the inductor 3 and the substrate 1 is relatively troublesome. Therefore, an embodiment of this application provides a power inductor. The power inductor provided in embodiments of this application is described in detail below with reference to the accompanying drawings and embodiments.

Figure 2:
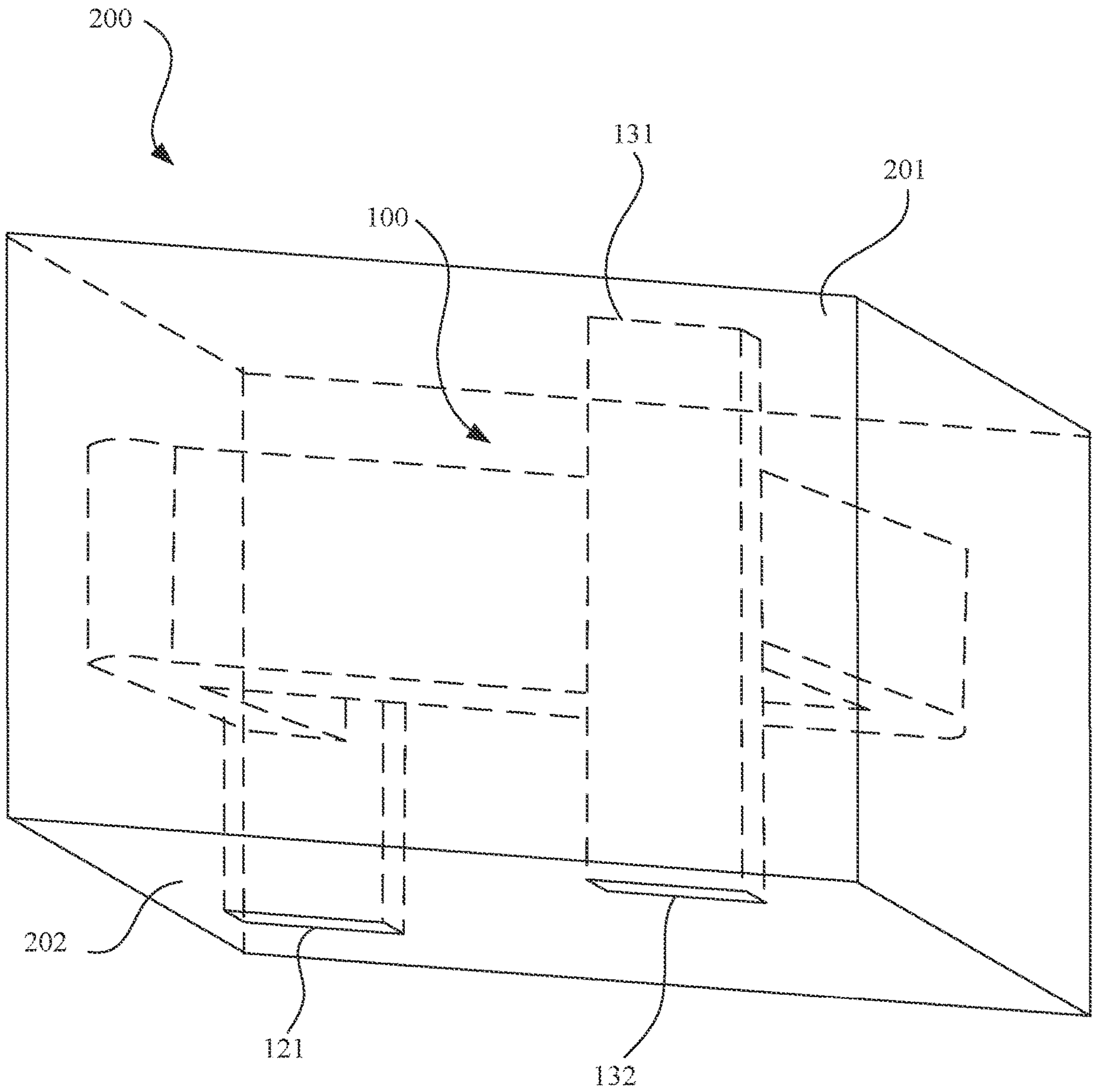
FIG. 2 is a three-dimensional diagram of a power inductor according to an embodiment of this application.

FIG. 2 is a schematic diagram of a three-dimensional structure of a power inductor according to an embodiment of this application. A dashed line in FIG. 2 represents a partial blocked structure outline of the power inductor and an internal outline of the power inductor.

The power inductor may include a winding 100 and a metal magnetic powder core 200. The metal magnetic powder core 200 is a body structure of the power inductor, and a shape of the metal magnetic powder core 200 is a shape of the power inductor. The winding 100 is located in the metal magnetic powder core 200. For example, the winding 100 may be located at a center position of the power inductor, and the metal magnetic powder core 200 is pressed and formed on a periphery of the winding 100 and wraps the winding 100.

During preparation, the metal magnetic powder core 200 is insulated from the winding 100. During preparation of the metal magnetic powder core 200, the metal magnetic powder core 200 is formed by pressing metal magnetic powder, and an external surface of the metal magnetic powder is wrapped with an insulating organic material or an inorganic material, such that there is an insulation layer on a surface of the metal magnetic powder core 200 formed by pressing the metal magnetic powder. When the metal magnetic powder core 200 wraps the winding 100, the insulation layer is in contact with the winding 100, and the metal magnetic powder core 200 is insulated from the winding 100.

The winding 100 has a first pin 121 and a second pin 131, and the first pin 121 and the second pin 131 are exposed on different surfaces of the metal magnetic powder core 200. Different surfaces of the metal magnetic powder core 200 indicate different external surfaces of the metal magnetic powder core 200, such as two adjacent external surfaces or two opposite external surfaces. For example, the first pin 121 and the second pin 131 of the winding 100 are exposed on two opposite external surfaces of the metal magnetic powder core 200, and the two external surfaces are separately used as surfaces on which the power inductor cooperates with other components. For example, the metal magnetic powder core 200 has a first external surface 202 and a second external surface 201. The first external surface 202 and the second external surface 201 are separately the surfaces on which the power inductor cooperates with the other components. With reference to the application scenario shown in FIG. 1, the first external surface 202 may be a surface that cooperates with a substrate, and the second external surface 201 is a surface that is away from the first external surface 202. During assembly, the first pin 121 of the winding 100 is exposed on the first external surface 202, and the second pin 131 is exposed on the second external surface 201. In use, the first pin 121 and the second pin 131 are used as external pins of the power inductor, and a current may flow in from the first pin 121 or the second pin 131, and flow out from the other pin of the winding 100.

In an optional solution, the winding 100 may further have three pins: the first pin 121, the second pin 131, and a third pin 132. The first pin 121 and the third pin 132 of the winding 100 are located on a same surface (the first external surface 202) of the metal magnetic powder core 200. In use, the first pin 121, the second pin 131, and the third pin 132 are used as external pins of the power inductor, and a current may flow in from one of the first pin 121, the second pin 131, and the third pin 132, and flow out from another pin in the three pins.

When the metal magnetic powder core 200 provided in this embodiment of this application is insulated from and wraps the winding 100, the metal magnetic powder core 200 wraps the winding 100 by using a pressing process. In a pressing process, pressure in a process of forming the inductor may be increased, such that magnetic permeability of the metal magnetic powder core 200 can be improved, inductance of the prepared power inductor is improved, and miniaturization of the power inductor is facilitated. In addition, after the pressing is completed, high-temperature annealing is performed on the metal magnetic powder core 200, such that loss of a magnetic material can be significantly reduced. Therefore, temperature at which the power inductor works is reduced, and the power inductor may be disposed at a position that is in a SiP module and that is relatively far away from a heat dissipation apparatus.

In an optional solution, the metal magnetic powder core 200 is in a cuboid structure. However, it should be understood that FIG. 2 is only an example of a magnetic powder core. The metal magnetic powder core 200 provided in this embodiment of this application may be pressed into different shapes such as a cylinder, a cylindroid, a cube, or a trapezoid based on a requirement. A shape only needs to adapt to assemble space of the power inductor.

The metal magnetic powder core 200 is a magnetic core made of metal alloy powder with low magnetic core loss at a high frequency. There are uniformly distributed air gaps inside the metal magnetic powder core 200, such that magnetic flux is not leaked, and the metal magnetic powder core 200 is not prone to saturation at a high direct current. Therefore, the power inductor prepared by using the metal magnetic powder core 200 is characterized by a high current, a high frequency, miniaturization, and the like.

The metal magnetic powder core 200 may be prepared by using different types of materials, for example, different types of metal magnetic powder cores such as an iron powder core, an iron-silicon-aluminum magnetic core, a high magnetic flux powder core, and a molybdenum permol magnetic powder core. Compositions of the iron powder core are a combination of extremely fine iron powder and an organic material. Magnetic permeability of the iron powder core is between 10 and 75. Compositions of the iron-silicon-aluminum magnetic core are iron that accounts for 85 percent (%), silicon that accounts for 9%, and aluminum that accounts for 6%. The iron-silicon-aluminum magnetic core is relatively low in loss and hard in material, and magnetic permeability of the iron-silicon-aluminum magnetic core may be 26, 60, 75, 90, 125, or the like. The high magnetic flux powder core is an iron-nickel magnetic powder core, and alloy powder of the high magnetic flux powder core may include nickel that accounts for 50% and iron that accounts for 50%. The high magnetic flux powder core has the highest magnetic flux density. Loss of the high magnetic flux powder core is higher than that of the iron-silicon-aluminum magnetic core and lower than that of the iron magnetic core. Magnetic permeability of the high magnetic flux powder core is in a range from 14 to 200. Compositions of the molybdenum permol magnetic powder core are molybdenum that accounts for 2%, nickel that accounts for 81%, and iron that accounts for 17%. In the foregoing magnetic powder cores, the molybdenum permol magnetic powder core has the lowest loss and the lowest saturation magnetic flux density. In addition, the molybdenum permol magnetic powder core has good temperature stability and magnetic permeability is in a range from 14 to 550. In an optional solution, metal magnetic powder of the metal magnetic powder core 200 provided in this embodiment of this application may be prepared by using a material including iron silicon, iron silicon aluminum, iron silicon chromium, and iron silicon aluminum nickel. An outer layer of the metal magnetic powder is warped by an insulation layer, and may be prepared by using an organic material or an inorganic material. For example, the organic material may use lipid such as epoxy resin, and the inorganic material may use lipid such as silicon resin.

Figure 3:
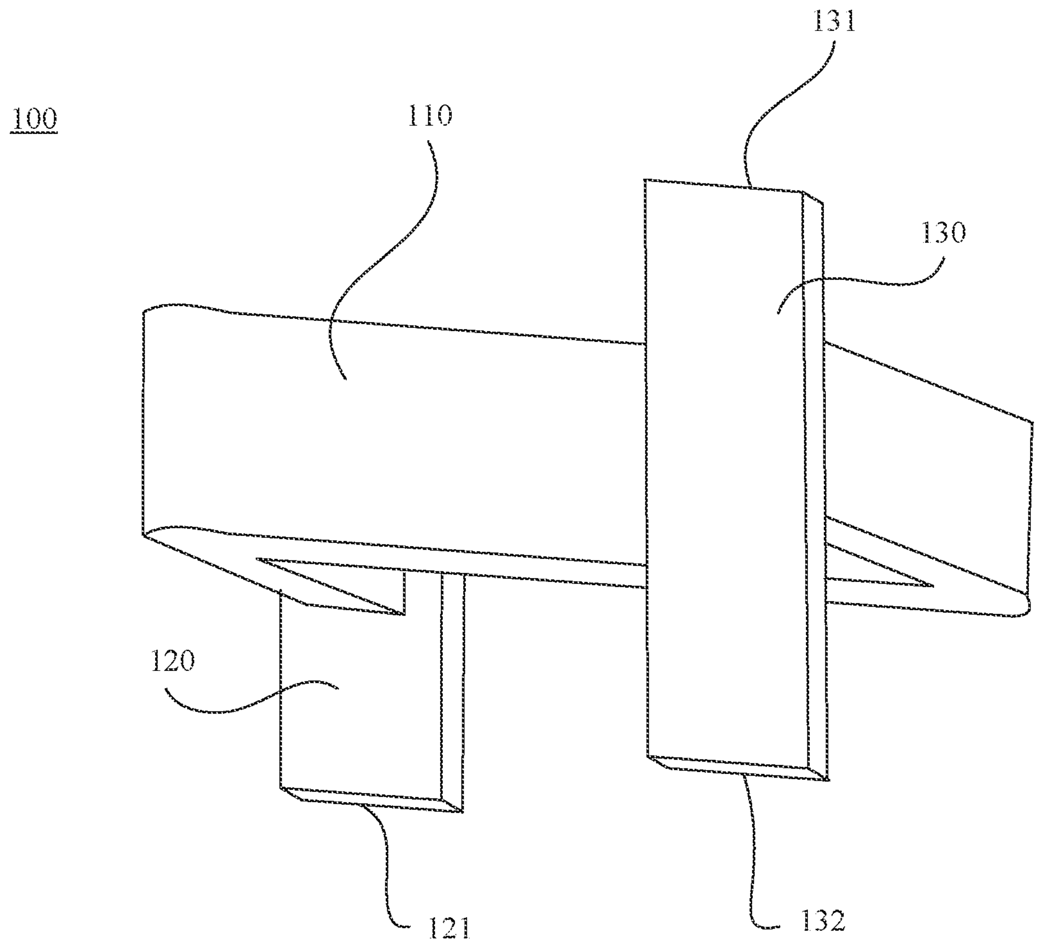
FIG. 3 is a schematic diagram of a structure of a winding of a power inductor according to an embodiment of this application.

FIG. 3 is a schematic diagram of a structure of the winding according to an embodiment of this application. The winding 100 is a metal conductive sheet prepared by using a conductive metal material, such as a metal material having good conductivity such as copper or aluminum. For example, the winding 100 uses a bare copper sheet formed through stamping, and is different from a winding made of an enameled wire. The bare copper sheet has good conductivity and relatively low resistance. When used in the power inductor, the winding 100 can reduce heat generated by the power inductor, and has a relatively low heat dissipation effect. In an example, the winding 100 may be assembled at a position that is in a SiP module and that is relatively far away from a heat dissipation apparatus.

The winding 100 includes a body structure 110 and connection structures. The connection structures provided in this embodiment of this application include a first connection structure 120 and a second connection structure 130. The first connection structure 120 and the second connection structure 130 are located at two ends of the body structure 110, and the first connection structure 120 and the second connection structure 130 are connected to the two ends of the body structure 110 in a one-to-one correspondence. It should be understood that a connection provided in this embodiment of this application may include different connection manners such as welding, an electrical connection, or integrated forming. In an optional solution, the first connection structure 120, the second connection structure 130, and the body structure 110 are prepared by using an integrated forming process. For example, the winding 100 may be formed by stamping a copper sheet, or may be formed after performing processing after stamping, and the first connection structure 120, the second connection structure 130, and the body structure 110 are an integrated structure.

The first connection structure 120 extends to the first external surface of the metal magnetic powder core, and the first connection structure 120 extends to an end of the first external surface as the first pin 121. The second connection structure 130 extends to the second external surface of the metal magnetic powder core, and the second connection structure 130 extends to an end of the second external surface as the second pin 131. The first pin 121 and the second pin 131 are pins at which the power inductor is connected to a cooperating device. The first pin 121 and the second pin 131 are located on two surfaces the power inductor that are away from each other, such that a vertical power supply requirement can be met, and a power supply path can be shortened. In an example, the power inductor may be applied to a SiP module in a vertical layout, such that adaptability of the power inductor is improved.

In an optional solution, the first connection structure 120, the second connection structure 130, and the body structure 110 are plate-shaped structures. During preparation, the first connection structure 120, the second connection structure 130, and the body structure 110 may be formed through pressing, or integrally formed by pouring a mold.

Figure 4:
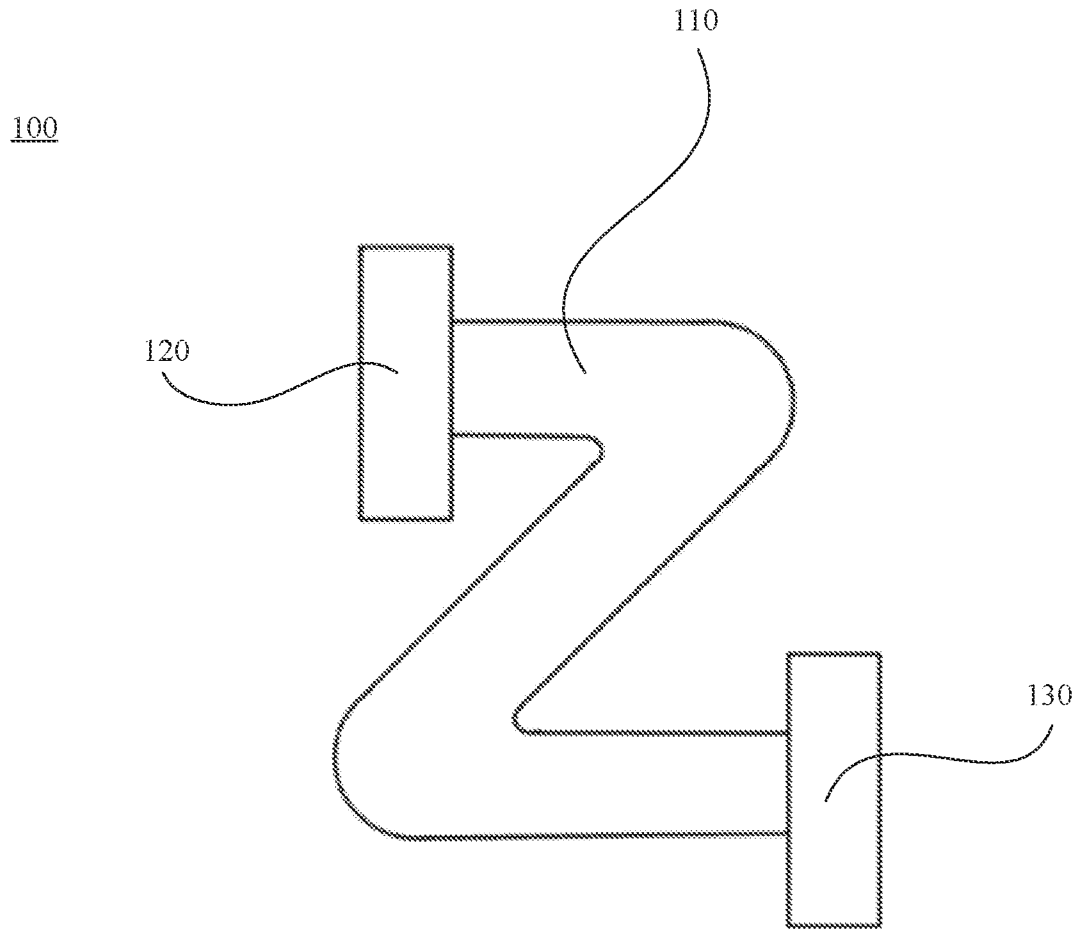
FIG. 4 is a top view of a winding according to an embodiment of this application.

Referring to FIG. 4, FIG. 4 is a top view of the winding. The body structure 110 is Z-shaped, the first connection structure 120 is connected to one end of the Z-shaped body structure 110, and the second connection structure 130 is connected to the other end of the Z-shaped body structure 110. When the foregoing structure is used, the body structure 110 is bent to form a Z-shape, such that a space volume occupied by the body structure 110 can be reduced, and a longer winding 100 can be accommodated in the metal magnetic powder core. With reference to the three-dimensional diagram of the power inductor shown in FIG. 2, when the body structure 110 is bent to form the Z-shape, the power inductor may use a smaller volume while inductance is the same. In addition, the body structure uses a Z-shaped structure, such that the power inductor has more uniform magnetic density and larger inductance.

It should be understood that the winding shown in FIG. 3 and FIG. 4 is merely an example of the winding provided in this embodiment of this application. The winding provided in this embodiment of this application may alternatively use another shape. For example, the body structure of the winding may alternatively use another shape such as an L-shape, an S-shape, or an M-shape.

In an optional solution, a length direction of the first connection structure 120 and a length direction of the second connection structure 130 are perpendicular to a length direction of the body structure 110. When the metal magnetic powder core wraps the winding 100, the length direction of the first connection structure 120 and the length direction of the second connection structure 130 are perpendicular to the first external surface and the second external surface, and the length direction of the body structure 110 is parallel to the first external surface and the second external surface. When the metal magnetic powder core is pressed, the length direction of the body structure 110 is parallel to the first external surface and the second external surface, such that placement of the winding 100 is facilitated, and production efficiency is improved.

It should be understood that the foregoing manner of disposing the winding 100 is merely an example provided in this embodiment of this application. In the winding 100 provided in this embodiment of this application, a manner in which an included angle of the length direction of the body structure 110 and the length direction of the first connection structure 120 and the second connection structure 130 is an acute angle may also be used. However, regardless of a used form, the winding 100 may be applied to this embodiment of this application provided that the winding 100 can be wrapped by the metal magnetic powder core.

Still referring to FIG. 3, in an optional solution, the second connection structure 130 further extends to the first external surface of the metal magnetic powder core, and the second connection structure 130 extends to the end of the first external surface as the third pin 132. The first pin 121 and the third pin 132 are located on a same side and are arranged at intervals. The second pin 131 is located on the opposite side, and all the three pins may be used as connection ends of the winding 100. With reference to the three-dimensional structure of the power inductor shown in FIG. 2, the third pin 132 formed by using the second connection structure 130 adds a pin at which the power inductor is connected to the cooperating component, and the first pin 121 and the third pin 132 are arranged at intervals on the first external surface, and both may be connected to the pin cooperating with the power inductor. When different pins of the power inductor are selected to be connected to the cooperating component, power inductors with different inductance values can be formed.

Different current paths in the power inductor are described below with reference to the accompanying drawings. For convenience of describing the current path, a flowing direction of a current is shown by a straight line with an arrow, but the current in the current path may also flow in a reverse direction of the direction shown by the arrow.

Figure 5:
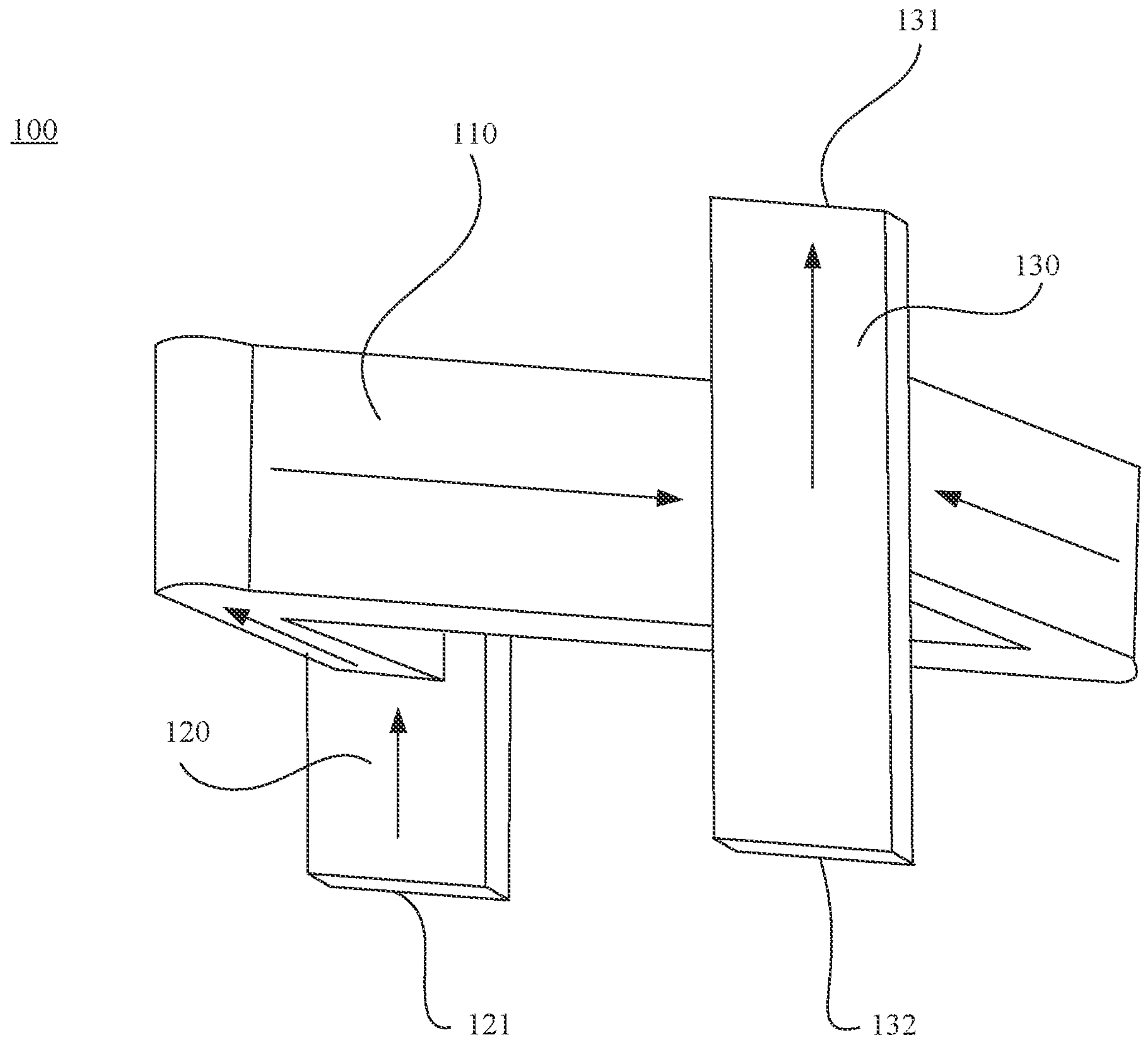
FIG. 5 is a schematic diagram of a current in a winding in one connecting manner of pins of a power inductor according to an embodiment of this application.

FIG. 5 is a schematic diagram of a current in the winding in one connecting manner of pins of the power inductor. When the first pin 121 and the second pin 131 of the power inductor are separately connected to the cooperating component, a current flows in from the first pin 121 of the first connection structure 120, flows through a part of the first connection structure 120, the body structure 110, and the second connection structure 130, and then flows out from the second pin 131. For ease of description, a length of the foregoing path through which the current flows is referred to as a second current path length.

Figure 6:
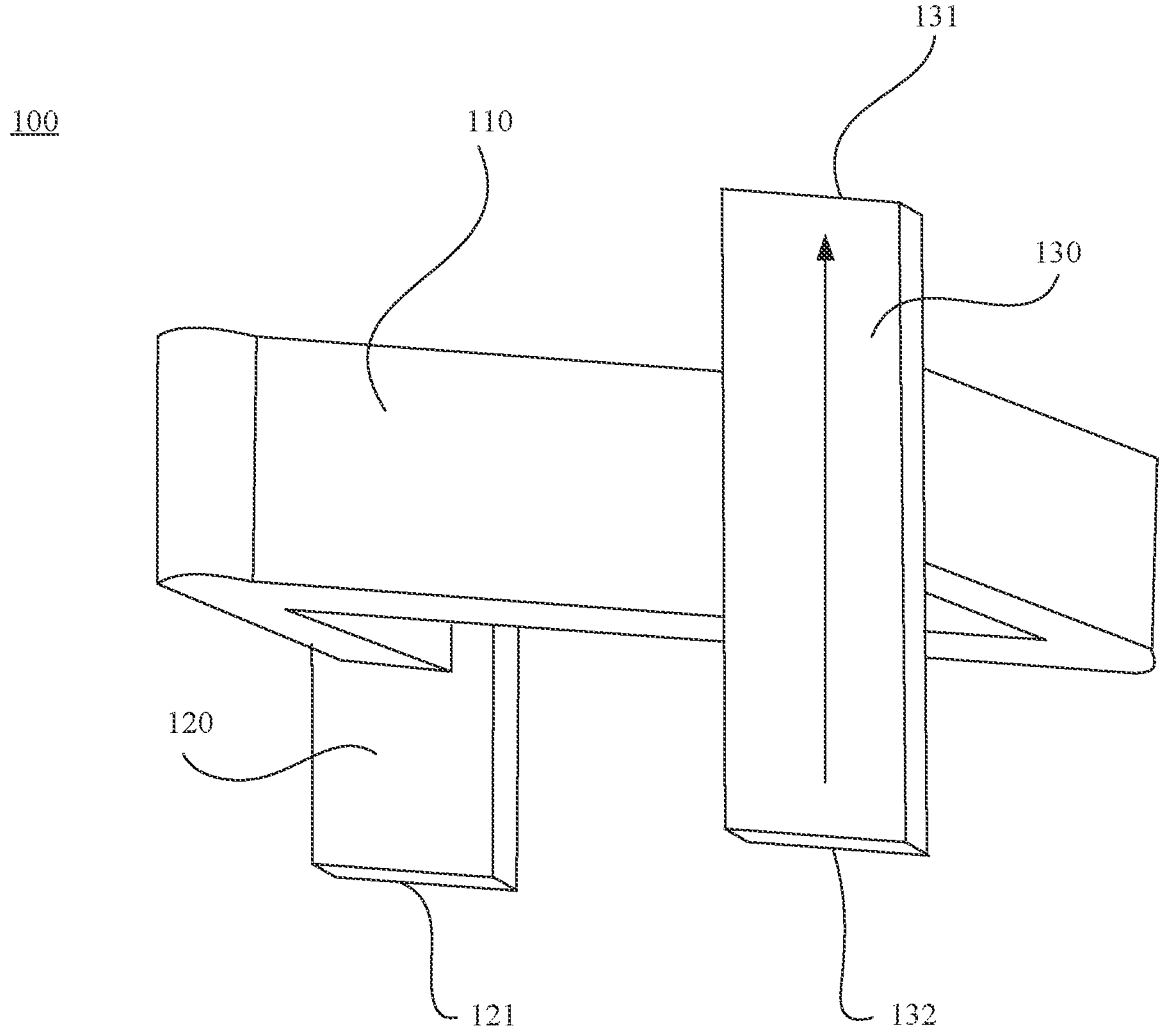
FIG. 6 is a schematic diagram of a current in a winding in another connecting manner of pins of a power inductor according to an embodiment of this application.

FIG. 6 is a schematic diagram of a current in the winding in another connecting manner of pins of the power inductor. When the third pin 132 and the second pin 131 of the power inductor are separately connected to the cooperating component, a current flows in from the third pin 132 of the second connection structure 130, and flows out from the second pin 131 after flowing through only the second connection structure 130. For ease of description, a length of the foregoing path through which the current flows is referred to as a first current path length.

It may be learned from comparison between FIG. 5 and FIG. 6 that the first current path length is less than the second current path length. Therefore, the power inductor provided in this embodiment of this application can provide different inductance values when different pins are selected to cooperate with another component.

Figure 7:
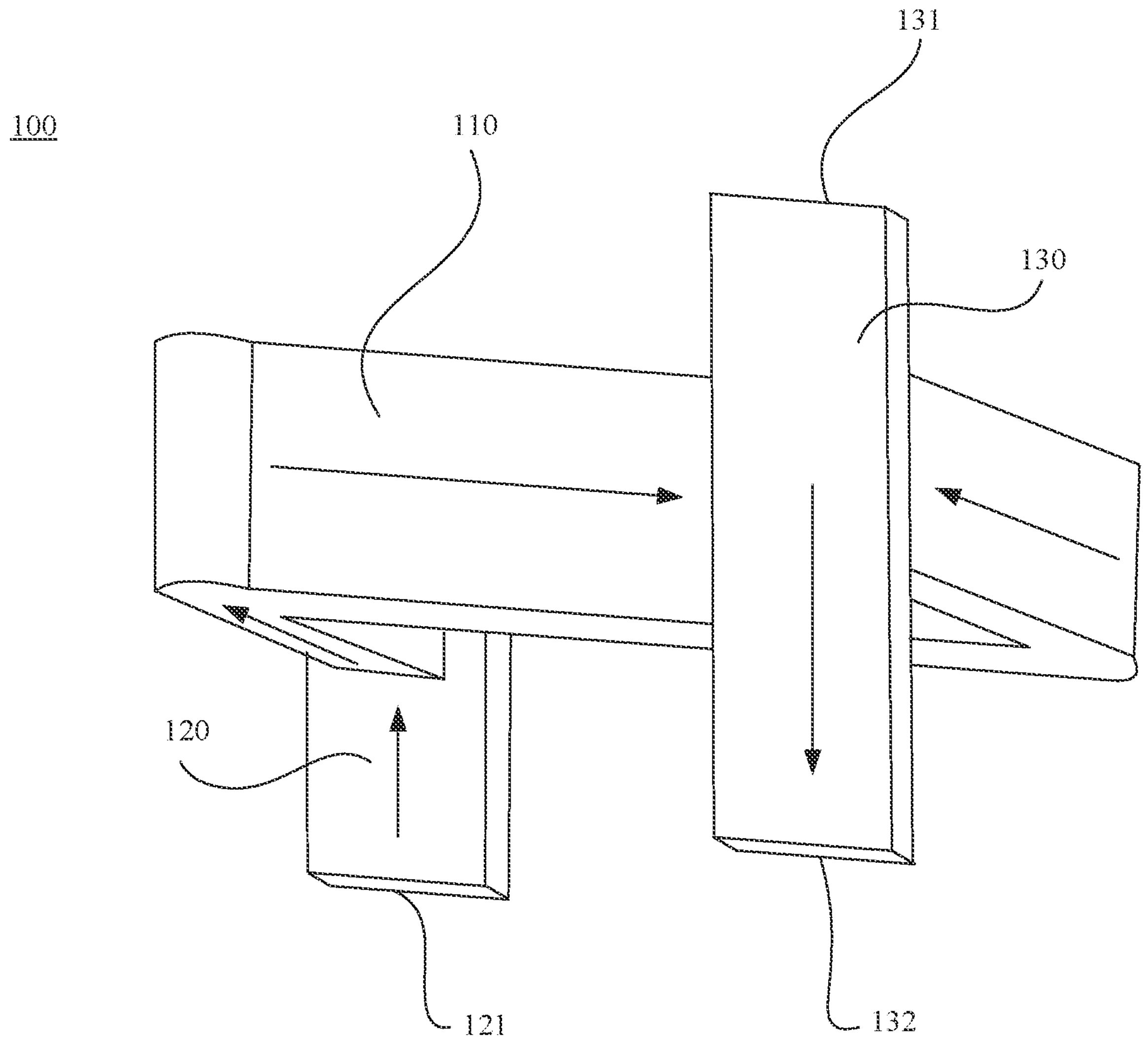
FIG. 7 is a schematic diagram of a current in a winding in another connecting manner of pins according to an embodiment of this application.

FIG. 7 is a schematic diagram of a current in the winding in another connecting manner of pins of the power inductor. When the first pin 121 and the third pin 132 of the power inductor are separately connected to the cooperating component, a current flows in from the first pin 121 of the first connection structure 120, flows through a part of the first connection structure 120, the body structure 110, and the second connection structure 130, and then flows out from the third pin 132 of the second connection structure 130. It may be learned from FIG. 7 that the power inductor provided in this embodiment of this application may alternatively be connected to the cooperating component by using pins on a same surface.

It may be learned from FIG. 5, FIG. 6, and FIG. 7 that when the power inductor uses the first pin 121, the third pin 132, and the second pin 131, the power inductor may be applicable to different working scenarios, that is, may be applicable to separately connecting to different components by using pins on two end surfaces, and may also be used in a scenario in which the power inductor only needs to be connected to the component by using pins on a same surface. Therefore, applicability of the power inductor is significantly improved.

It should be understood that a quantity of first pins on the first external surface provided in this embodiment of this application may be different quantities such as one, two, or three. Similarly, a quantity of second pins on the second external surface may also be different quantities such as one, two, or three. The quantity of first pins and the quantity of second pins may be set based on a requirement of the power inductor.

Figure 8:
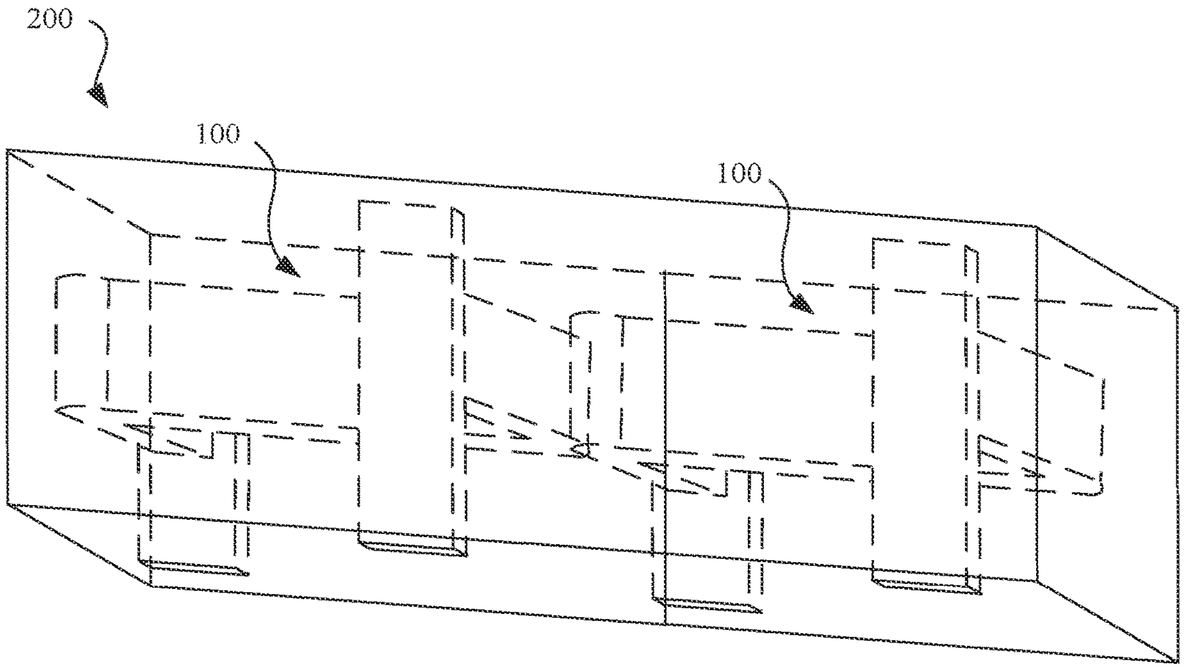
FIG. 8 is a schematic diagram of a structure of another power inductor according to an embodiment of this application.

FIG. 8 is a schematic diagram of a structure of another power inductor according to an embodiment of this application. For some reference numerals in FIG. 8, refer to the same reference numerals in FIG. 2. The power inductor shown in FIG. 8 is an integrated power inductor group, and the power inductor group includes a plurality of windings 100. In FIG. 8, two windings 100 are shown as an example. It should be understood that the power inductor provided in this embodiment of this application may include different quantities of windings 100, such as two, three, four, or five windings 100.

The windings 100 may be arranged based on an application scenario of the windings 100. For example, the plurality of windings 100 may be arranged in different arrangement manners, such as array arrangement, single-row arrangement, or triangular arrangement.

In an optional solution, the plurality of windings 100 share the metal magnetic powder core 200. In other words, when the metal magnetic powder core 200 is pressed, the plurality of windings 100 may be insulated and wrapped simultaneously, such that modularization of the power inductor is facilitated. In addition, two-phase or multi-phase power inductor integration helps reduce a component volume, and helps implement a requirement of a SiP module with high integration in a vertical direction.

To facilitate understanding of the structure of the power inductor provided in this embodiment of this application, a preparation method of the power inductor is described in detail below with reference to the accompanying drawings.

The preparation method includes the following steps.

Step 001: Press a first segment of metal magnetic powder core.

Figure 9:
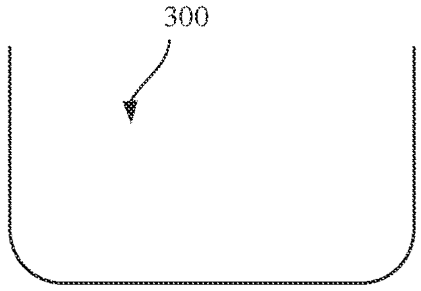
FIG. 9 to FIG. 12 are schematic flowcharts of preparing a power inductor according to an embodiment of this application.
Figure 10:
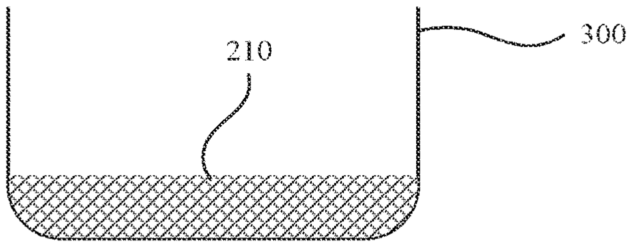

As shown in FIG. 9, a mold 300 is prepared, and the mold 300 is configured to press a power inductor. As shown in FIG. 10, the metal magnetic powder core is pressed in a plurality of segments. First, the first segment 210 of metal magnetic powder core that needs to be pressed is placed in the mold 300. The metal magnetic powder core may use a material such as iron silicon, iron silicon aluminum, iron silicon chromium, or iron silicon aluminum nickel.

Step 002: In a process of pressing the metal magnetic powder core in segments, fill a winding into the metal magnetic powder core.

Figure 11:
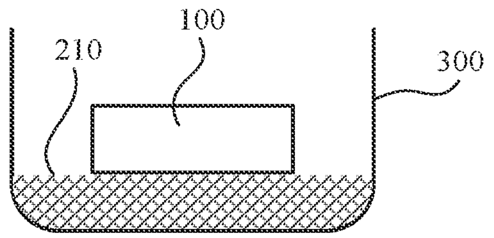

As shown in FIG. 11, a winding 100 is placed in the mold 300, and when the winding 100 is placed, it should be ensured that the winding 100 is partially exposed on a first external surface of the metal magnetic powder core and is used as a first pin, and is partially exposed on a second external surface of the metal magnetic powder core and is used as a second pin. The winding 100 uses a bare copper sheet, and is different from a winding made of an enameled wire. The bare copper sheet may be formed by stamping a copper sheet, or may be formed by performing processing after pressing. In addition, in addition to that the first pin and the second pin are separately located on a first external surface and a second external surface shown in FIG. 11, the first pin and the second pin may alternatively be located on different surfaces of the metal magnetic powder core, for example, on two adjacent surfaces.

Step 003: Press a remaining metal magnetic powder core.

Figure 12:
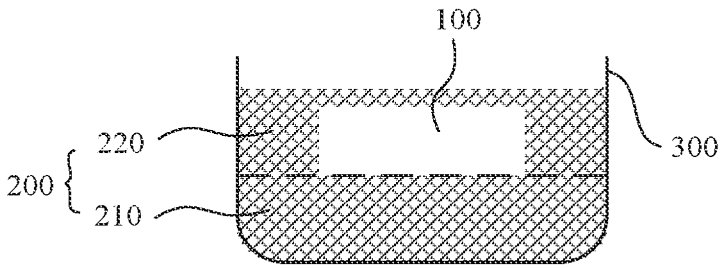

In an example, as shown in FIG. 12, metal magnetic powder is placed in the mold 300. The metal magnetic powder wraps the winding 100, and a second segment 220 of metal magnetic powder core is pressed, such that the winding 100 is insulated from and wrapped in the metal magnetic powder core 200.

Step 004: After the metal magnetic powder core is pressed in segments, perform high-temperature annealing.

In an example, high-temperature annealing is performed after pressing, to form a power inductor. During high-temperature annealing, annealing temperature of the high-temperature annealing is not less than 400° C., and for example, the annealing temperature may be different temperature such as 500° C., 600° C., or 700° C. When the high-temperature annealing is used, loss of a magnetic material is reduced, and overall loss of the inductor is finally reduced, to ensure that the inductor has relatively low operating temperature.

It can be learned from the foregoing descriptions that, in a process of pressing the power inductor, the metal magnetic powder core is pressed in segments based on a shape of the winding. For example, the metal magnetic powder core can be pressed in two segments, or the metal magnetic powder core can be pressed in three segments. For example, when the metal magnetic powder core is pressed in two segments, a lower part of the metal magnetic powder core may be pressed first, and then an upper part of the metal magnetic powder core is pressed. When the metal magnetic powder core is pressed in three segments, an upper part and a lower part of the metal magnetic powder core may be pressed first, and then a middle part of the metal magnetic powder core is pressed.

In addition, when the foregoing segmented pressing process is used, pressure in the process of forming the power inductor may be increased, magnetic permeability of a material of the metal magnetic powder core can be improved, and inductance of the metal magnetic powder core can be improved. Therefore, under a condition of same inductance, miniaturization of the power inductor is facilitated.

An embodiment of this application further provides a SiP module. The SiP module is a packaging manner in which all or a majority of electronic functions of a system or subsystem are configured on an integrated substrate and a chip is bonded to the integrated substrate. The SiP module may not only be assembled with a plurality of chips, but also be installed on a same substrate as a dedicated processor, a dynamic random access memory (DRAM), a flash memory, and a passive component in combination with a resistor, a capacitor, a connector, an antenna, and the like. The SiP module provided in this embodiment of this application includes a circuit board and a power inductor disposed in any one of the foregoing descriptions that is disposed on the circuit board. Pins are separately disposed on two opposite surfaces of the power inductor, such that the power inductor can match a SiP module in which components are arranged in a vertical direction. Therefore, disposing of the power inductor is facilitated. In addition, in the foregoing power inductor, a degree of integration of components in a vertical direction of the SiP module can be increased, to implement high power and miniaturization of the SiP module.

A person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A power inductor, comprising:
a winding comprising:
a body structure comprising a first end and a second end;
a first connection structure connected to the first end and comprising a first pin; and
a second connection structure connected to the second end and comprising a second pin and a third pin, wherein the winding comprises a stamped bare copper sheet; and
a metal magnetic powder core that is pressed to the winding,
wherein the metal magnetic powder core is insulated from the winding,
wherein the first connection structure extends to a first external surface of the metal magnetic powder core,
wherein the second connection structure extends to a second external surface of the metal magnetic powder core as the second pin and extends to the first external surface of the metal magnetic powder core as the third pin,
wherein the first pin and the third pin are exposed on the first external surface, and
wherein the second pin is exposed on the second external surface.

2. The power inductor of claim 1, wherein a first length direction of the first connection structure and a second length direction of the second connection structure are perpendicular to a third length direction of the body structure, wherein the first length direction and the second length direction are perpendicular to the first external surface and the second external surface, and wherein the third length direction of the body structure is parallel to the first external surface and the second external surface.

3. The power inductor of claim 1, further comprising an insulation layer on a surface of the metal magnetic powder core that contacts and wraps the winding.

4. The power inductor of claim 1, further comprising:
a first current path length from the first pin to the second pin; and
a second current path length from the third pin to the second pin, wherein the first current path length is less than the second current path length.

5. The power inductor of claim 1, wherein the body structure is Z-shaped, wherein the first connection structure is connected to the first end, and wherein the second connection structure is connected to the second end.

6. The power inductor of claim 1, further comprising a plurality of windings, wherein the windings are arranged in a single row.

7. A system in package module, comprising:
a circuit board; and
a power inductor disposed on the circuit board, wherein the power inductor comprises:
a winding comprising:
a body structure comprising a first end and a second end;
a first connection structure connected to the first end and comprising a first pin; and
a second connection structure connected to the second end and comprising a second pin and a third pin, wherein the winding comprises a stamped bare copper sheet; and
a metal magnetic powder core that is pressed to the winding,
wherein the metal magnetic powder core is insulated from the winding,
wherein the first connection structure extends to a first external surface of the metal magnetic powder core,
wherein the second connection structure extends to a second external surface of the metal magnetic powder core as the second pin and extends to the first external surface of the metal magnetic powder core as the third pin,
wherein the first pin and the third pin are exposed on the first external surface, and
wherein the second pin is exposed on the second external surface.

8. The system in package module of claim 7, wherein the power inductor further comprises a plurality of windings, and wherein the windings are arranged in a single row.

9. The system in package module of claim 7, wherein a first length direction of the first connection structure and a second length direction of the second connection structure are perpendicular to a third length direction of the body structure, wherein the first length direction and the second length direction are perpendicular to the first external surface and the second external surface, and wherein the third length direction of the body structure is parallel to the first external surface and the second external surface.

10. The system in package module of claim 7, wherein the body structure is Z-shaped, wherein the first connection structure is connected to the first end, and wherein the second connection structure is connected to the second end.

11. The system in package module of claim 7, further comprising an insulation layer on a surface of the metal magnetic powder core that contacts and wraps the winding.

12. The system in package module of claim 7, wherein the power inductor further comprises:
a first current path length from the first pin to the second pin; and
a second current path length from the third pin to the second pin, wherein the first current path length is less than the second current path length.

13. The power inductor of claim 1, wherein the first pin and the third pin are located on a same surface of the metal magnetic powder core and arranged at an interval.

14. The power inductor of claim 1, wherein the power inductor is configured to match a system in package module comprising components arranged in a vertical direction.

15. The power inductor of claim 6, wherein the windings share the metal magnetic powder core.

16. The power inductor of claim 1, wherein the metal magnetic core is pressed into one or more of a cylinder, a cylindroid, a cube, or a trapezoid.

17. The system in package module of claim 7, wherein the first pin and the third pin are located on a same surface of the metal magnetic powder core and arranged at an interval.

18. The system in package module of claim 7, wherein the power inductor is configured to match components of the circuit board arranged in a vertical direction.

19. The system in package module of claim 8, wherein the windings share the metal magnetic powder core.

20. The system in package module of claim 7, wherein the metal magnetic core is pressed into one or more of a cylinder, a cylindroid, a cube, or a trapezoid.

* * * * *